(12) United States Patent
Nishikawa et al.

(10) Patent No.: US 10,915,082 B2
(45) Date of Patent: Feb. 9, 2021

(54) MICROCONTROLLER WITH ERROR SIGNAL OUTPUT CIRCUIT AND CONTROL METHOD OF THE SAME

(71) Applicant: Renesas Electronics Corporation, Tokyo (JP)

(72) Inventors: Takuro Nishikawa, Tokyo (JP); Masaki Fujigaya, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 186 days.

(21) Appl. No.: 16/048,282

(22) Filed: Jul. 29, 2018

(65) Prior Publication Data

US 2019/0094830 A1 Mar. 28, 2019

(30) Foreign Application Priority Data

Sep. 26, 2017 (JP) ................................ 2017-184355

(51) Int. Cl.
*G06F 11/18* (2006.01)
*G05B 19/042* (2006.01)
(Continued)

(52) U.S. Cl.
CPC ....... *G05B 19/0428* (2013.01); *G06F 1/3206* (2013.01); *G06F 1/3243* (2013.01);
(Continued)

(58) Field of Classification Search
CPC ...... G06F 11/18; G06F 11/188; G06F 11/183; G05B 2219/23
See application file for complete search history.

(56) References Cited

U.S. PATENT DOCUMENTS 5,305,325 A * 4/1994 Roos ...................... H04Q 11/04
714/703
5,384,533 A * 1/1995 Tokuda .......... G01R 31/318569
324/762.02
(Continued)

FOREIGN PATENT DOCUMENTS

JP 2008-518338 A 5/2008

OTHER PUBLICATIONS

Extended European Search Report dated Feb. 26, 2019, in European Patent Application No. 18187847.1.

*Primary Examiner* — Joseph O Schell
(74) *Attorney, Agent, or Firm* — SGPatents PLLC

(57) ABSTRACT

To provide a microcontroller that suppresses increase of power consumption during debugging, a microcontroller according to the present invention includes a first signal processing circuit, a second signal processing circuit that performs signal processing in the same manner as the first signal processing circuit, a comparing circuit that compares a processing result of the first signal processing circuit and a processing result of the second signal processing circuit with each other, and outputs an error signal when an error is detected, a suppressing signal input unit that receives a suppressing signal for suppressing an operation of the second signal processing circuit and an operation of the comparing circuit, a suppressing circuit that receives the suppressing signal from the suppressing signal input unit and suppresses the operation of the second signal processing circuit and the operation of the comparing circuit, and a pseudo error signal output circuit that outputs a pseudo error signal in place of the error signal, when the operation of the second signal processing circuit and the operation of the comparing circuit are suppressed.

10 Claims, 7 Drawing Sheets

(51) Int. Cl.
    *G06F 1/3206*     (2019.01)
    *G06F 1/3287*     (2019.01)
    *G06F 1/3234*     (2019.01)
    *G06F 11/16*     (2006.01)
    *G06F 11/36*     (2006.01)
    *G06F 1/20*     (2006.01)
    *G06F 1/3293*     (2019.01)

(52) U.S. Cl.
    CPC .......... *G06F 1/3287* (2013.01); *G06F 11/183* (2013.01); *G05B 2219/23283* (2013.01); *G05B 2219/24093* (2013.01); *G06F 1/206* (2013.01); *G06F 1/3293* (2013.01); *G06F 11/1641* (2013.01); *G06F 11/362* (2013.01)

(56) References Cited

U.S. PATENT DOCUMENTS

| | | | | |
|---|---|---|---|---|
| 6,247,160 | B1* | 6/2001 | Davidsson | G06F 11/1604 326/35 |
| 7,853,819 | B2 | 12/2010 | Kottke | |
| 8,327,248 | B2* | 12/2012 | Satterfield | G06F 11/267 714/797 |
| 2004/0059875 | A1* | 3/2004 | Garg | G06F 12/0806 711/141 |
| 2008/0244305 | A1* | 10/2008 | Troppmann | G06F 11/1641 713/601 |
| 2009/0319812 | A1* | 12/2009 | Laughlin | G06F 1/3203 713/322 |
| 2010/0122072 | A1* | 5/2010 | Yarimizu | G06F 11/1641 712/227 |
| 2014/0289553 | A1* | 9/2014 | Takano | G06F 11/1604 714/5.11 |

* cited by examiner

MICROCONTROLLER WITH ERROR SIGNAL OUTPUT CIRCUIT AND CONTROL METHOD OF THE SAME

CROSS-REFERENCE TO RELATED APPLICATIONS

The disclosure of Japanese Patent Application No. 2017-184355 filed on Sep. 26, 2017 including the specification, drawings and abstract is incorporated herein by reference in its entirety.

BACKGROUND

The present invention relates to a microcontroller and a control method of the same.

In a semiconductor device used in products in fields that require high reliability, for example, for automobile use, a portion of a circuit is duplicated to improve redundancy, thereby improving reliability in some cases. Examples employing duplication of a circuit include a microcontroller product in which a CPU (central processing unit) of a semiconductor device is duplicated and which employs a dual-core lock-step method. In the dual-core lock-step method, two cores, which look like a single core but are actually two, are linked by a lock-step mechanism, and an operation is performed after it is confirmed that the two cores output the same result. By operating while confirming the results output from the two cores in this manner, the dual-core lock-step method improves operation reliability of a semiconductor device.

Japanese Unexamined Patent Application Publication No. 2008-518338 describes a switching device in a computer system that includes at least two implementation units. The switching device is provided with a switch. The switch is configured in such a manner that these implementation units switch between at least two driving modes. In this case, the first driving mode corresponds to a comparison mode and the second driving mode corresponds to a performance mode. The switching device is provided with an interrupt controller and is further provided with at least three memory regions. In this case, an access to the memory regions is configured in such a manner that the first memory region is associated with at least one first implementation unit, the second memory region is associated with at least one second implementation unit, and at least one third memory region is associated with the at least two implementation units.

SUMMARY

In a semiconductor device including duplicated circuits, it is likely that maximum power consumption increases with increase of power consumption of the duplicated circuits. In a case of a microcontroller that is one of semiconductor devices, power consumption becomes maximum, for example, when all CPU cores operate with high loads and debugging is executed. Therefore, if a circuit operating when debugging is executed is duplicated, power consumption increases as compared with that in a related art.

However, debugging is executed in a development stage in many cases. When design of a peripheral circuit or thermal design for mass products is performed to be adaptable to the maximum power consumption during debugging, the part cost, the space, or the like may become excessive.

Other objects and novel features will be apparent from the description of this specification and the accompanying drawings.

According to an embodiment, a microcontroller includes: a first signal processing circuit; a second signal processing circuit that performs signal processing in the same manner as the first signal processing circuit; a comparing circuit that compares a processing result of the first signal processing circuit and a processing result of the second signal processing circuit with each other, and outputs an error signal when an error is detected; a suppressing signal input unit that receives a suppressing signal for suppressing an operation of the second signal processing circuit and an operation of the comparing circuit; a suppressing circuit that receives the suppressing signal from the suppressing signal input unit and suppresses the operation of the second signal processing circuit and the operation of the comparing circuit; and a pseudo error signal output circuit that outputs a pseudo error signal in place of the error signal, when the operation of the second signal processing circuit and the operation of the comparing circuit are suppressed.

According to an embodiment, a control method of a microcontroller that includes a first signal processing circuit, a second signal processing circuit that performs signal processing in the same manner as the first signal processing circuit, and a comparing circuit that compares a processing result of the first signal processing circuit and a processing result of the second signal processing circuit with each other, and outputs an error signal when an error is detected, includes: receiving a debug start signal; suppressing an operation of the second signal processing circuit and an operation of the comparing circuit in response to the debug start signal; and outputting a pseudo error signal in place of the error signal after the operation of the second signal processing circuit and the operation of the comparing circuit are suppressed.

According to the aforementioned embodiment, it is possible to provide a microcontroller that suppresses increase of power consumption during debugging.

DETAILED DESCRIPTION

Figure 1:
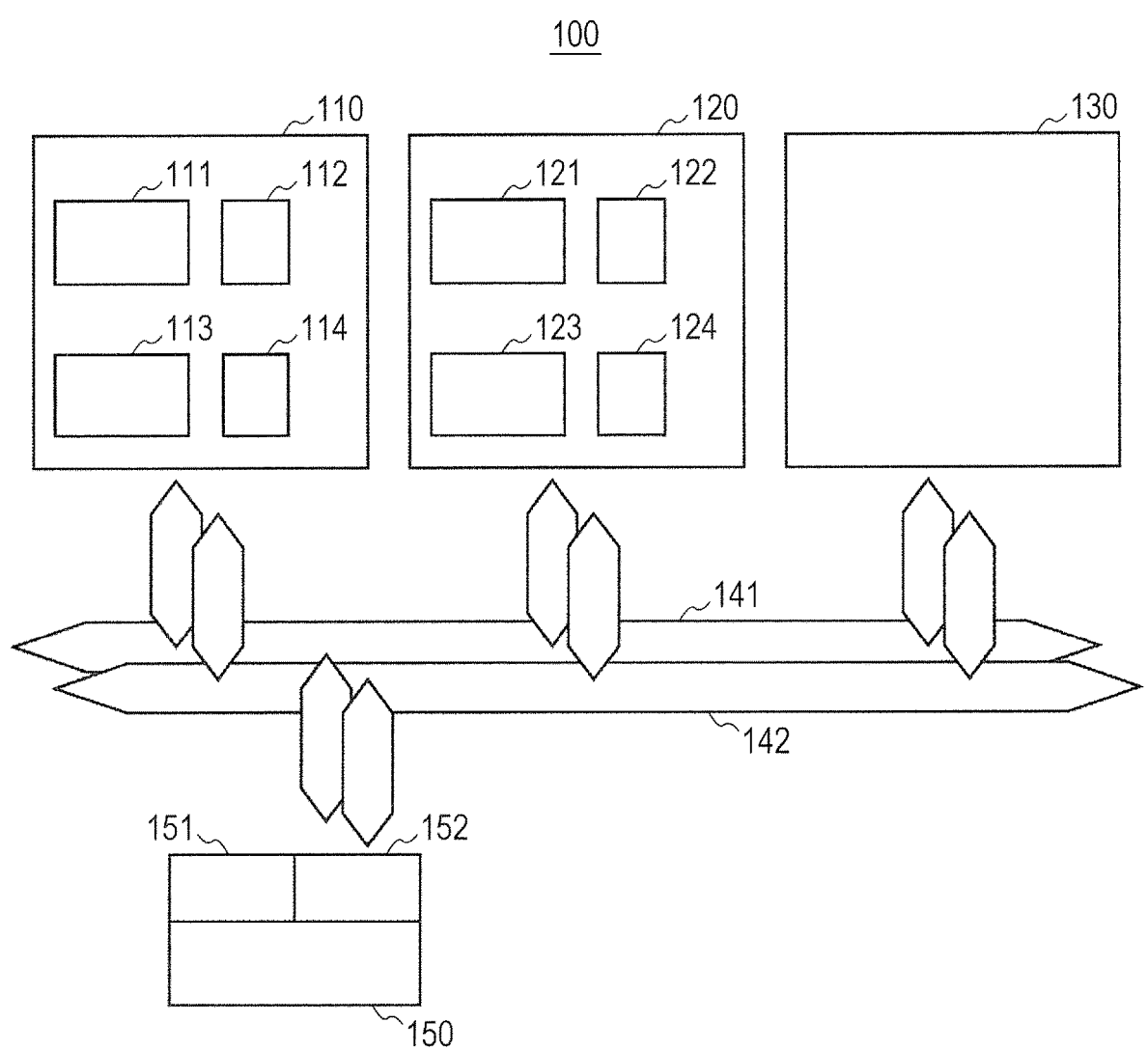
FIG. 1 is a schematic configuration diagram of a microcontroller according to a first embodiment.

Embodiments are described below referring to the drawings. Because the accompanying drawings are simplified ones, the technical scope of the embodiments should not be interpreted to be narrower on the basis of illustration of the drawings. The same component is labeled with the same reference sign, and redundant description is omitted.

The following embodiments will be described while being divided into a plurality of sections or embodiments, if necessary for the sake of convenience. However, unless otherwise specified, these are not independent of each other, but are in a relation such that one is a modification, applications, detailed explanations, complementary explanation, or the like of a part or the whole of the other. Further, in the following embodiments, when a reference is made to the number of elements and the like (including numerical value, quantity, range, and the like), the number of elements is not limited to the specific number but can be the specific number or more or less, unless otherwise specified, or except the case where the number is apparently limited to the specific number in principle, or except for other cases.

Further, in the following embodiments, the constitutional elements (including operation steps and the like) are not always essential, unless otherwise specified, or except the case where they are apparently considered essential in principle, or except for other cases. Similarly, in the following embodiments, when a reference is made to the shapes, positional relationships, and the like of the constitutional elements and the like, it is understood that they include ones substantially analogous or similar to the shapes and the like, unless otherwise specified, or unless otherwise considered apparently in principle, or except for other cases. These are also the same for the foregoing number and the like (including numerical value, quantity, range, and the like).

For clarifying explanation, omission and simplification are made in the following description and the drawings as appropriate. Each of elements illustrated in the drawings as functional blocks that perform various processes can be configured by a CPU, a memory, or another circuit if being achieved by hardware, and can be implemented by a program loaded to a memory if being implemented by software. Therefore, a person skilled in the art would understand that these functional blocks can be implemented by hardware only, software only, or a combination of hardware and software in various ways, and implementation of these components is not limited to any of them. Throughout the drawings, the same element is labeled with the same reference sign, and redundant description is omitted as necessary.

First Embodiment

A first embodiment is described below referring to FIGS. 1 to 5.

First, a microcontroller illustrated in FIG. 1 as an example is described. FIG. 1 is a schematic configuration diagram of a microcontroller according to the first embodiment. A microcontroller 100 is a control IC for controlling various systems. Examples of the system to be controlled include a power-train system for automobile, an air control system, and an autonomous driving system. The microcontroller 100 includes a central processing unit 110, a DMA control unit 120, an interface unit 130, and a storage unit 150 as main components. Each of the main components described above is coupled to a master bus 141 and a checker bus 142.

The central processing unit 110 has a calculating function of performing processing, such as calculation, for a received signal and outputting the processed signal. The central processing unit 110 includes a master core 111, a checker core 113, and self-diagnosis control units 112 and 114.

The master core 111 is a calculating unit for achieving the calculating function of the central processing unit 110. The checker core 113 has the same circuit configuration as the master core 111. Therefore, the master core 111 and the checker core 113 output the same calculation result for the same input signal. The central processing unit 110 inputs the same signal to each of the master core 111 and the checker core 113 and compares the calculation results respectively output from those cores with each other, thereby ensuring that the master core 111 operates normally.

The calculating unit can be a so-called CPU or a GPU (Graphics Processing Unit). The calculating unit can be also referred to as a signal processing circuit. That is, the central processing unit 110 includes a master core as a first signal processing circuit and a checker core as a second signal processing circuit.

The self-diagnosis control unit 112 achieves a portion of a function of diagnosing whether an operation of the master core 111 is normally performed. As a specific example, the self-diagnosis control unit 112 inputs a check input signal, which is preset, to the maser core 111. The self-diagnosis control unit 112 then receives a check output signal that is a calculation result for the check input signal from the master core 111, and stores therein the received check output signal.

The self-diagnosis control unit 114 has the same function as the self-diagnosis control unit 112 described above, for the checker core 113. As a specific example, the self-diagnosis control unit 114 inputs a check input signal, which is preset, to the checker core 113. The self-diagnosis control unit 114 then receives a check output signal that is a calculation result for the check input signal from the checker core 113, and stores therein the received check output signal.

The central processing unit 110 diagnoses whether the master core 111 operates normally by comparing the check output signals respectively stored in the self-diagnosis control units 112 and 114 with each other. The central processing unit 110 includes the master core 111 and the checker core 113 that has the same circuit configuration as the master core 111, thereby improving operation reliability of the master core 111.

The DMA control unit 120 has a function of DMA (Direct Memory Access) that makes an access to data in a memory not via the central processing unit 110. The DMA control unit 120 includes a master core 121, a checker core 123, and self-diagnosis control units 122 and 124. The master core 121 is a circuit for achieving the DMA function. That is, the master core 121 performs data transfer between the storage unit 150 and an input/output unit of a timer unit, an AD (Analog to Digital) converter, or a DA (Digital to Analog) converter, which is not illustrated, for example.

The checker core 123 has the same circuit configuration as the master core 121. Therefore, the master core 121 and the checker core 123 output the same signal for the same input signal. The DMA control unit 120 inputs the same signal to each of the master core 121 and the checker core 123 and compares the signals respectively output from those cores with each other, thereby ensuring that the master core 121 operates normally.

The self-diagnosis control units 122 and 124 have the same functions as the self-diagnosis control units 112 and 114 included in the central processing unit 110. Therefore, the detailed description is omitted here. The DMA control unit 120 includes the master core 121 and the checker core 123 that has the same circuit configuration as the master core 121, thereby improving operation reliability of the master core 121.

The interface unit 130 receives/transmits a signal from/to the outside of the microcontroller 100. For example, the interface unit 130 has an in-vehicle LAN, such as CAN (Controller Area Network), FlexRay, or the Ethernet (registered trademark), or an interface for system development, such as JTAG (Joint Test Action Group).

The storage unit 150 is a main storage unit of the microcontroller 100, and includes a volatile storage unit that is called a RAM (random access memory), for example. The storage unit 150 is coupled to a master RAM control unit 151 and a checker RAM control unit 152.

As described above, main components in the microcontroller 100 are duplicated. By duplicating the components, the microcontroller 100 improves operation reliability.

Figure 2:
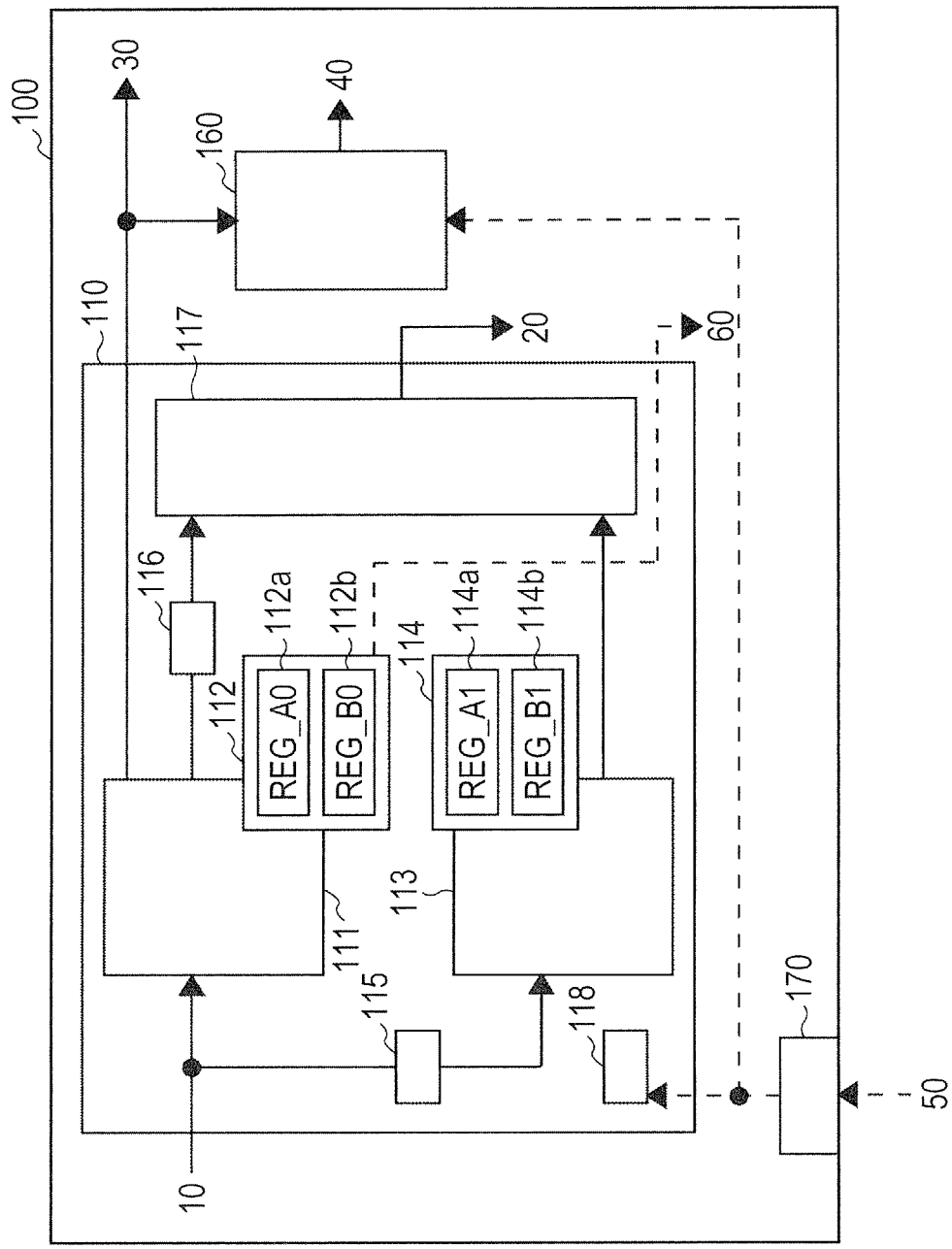
FIG. 2 is block diagram of a central processing unit 110 and its surrounding portion according to the first embodiment.

Next, a function of the microcontroller 100 is described referring to FIG. 2. FIG. 2 is block diagram of the central processing unit 110 and its surrounding portion according to the first embodiment.

Prior to the description of the function of the microcontroller 100, a configuration of the microcontroller 100 illustrated in FIG. 2 is described. The microcontroller 100 includes a debug circuit 160 and a debug terminal 170 in addition to the central processing unit 110.

The central processing unit 110 includes delay circuits 115 and 116, a comparing circuit 117, and a suppressing circuit 118 in addition to the master core 111, the checker core 113, and the self-diagnosis control units 112 and 114 described referring to FIG. 1.

The delay circuits 115 and 116 are circuits each delaying a received signal and outputting it. The delay circuits 115 and 116 are each achieved by a circuit configured by flip-flop circuits in cascade connection, for example. Because the delay circuits 115 and 116 have the same circuit configuration as each other, times of delaying an input signal are set to be equal to each other. The delay circuit 115 is coupled to an input stage of the checker core 113. The delay circuit 116 is coupled to an output stage of the master core 111. Therefore, the master core 111 and the checker core 113 included in the central processing unit 110 form a configuration of a clock-delayed dual-core lock-step method.

The self-diagnosis control unit 112 includes a register 112a and a register 112b. The register 112a and the register 112b are used in self diagnosis that operates at system start-up. A register address of the register 112a illustrated as an example in FIG. 2 is an address REG_A0. Similarly, a register address of the register 112b is an address REG_B0. The self-diagnosis control unit 112 has an output 60. The self-diagnosis control unit 112 is set to output a pseudo error signal to the output 60 when a preset value is input thereto. The pseudo error signal is the same signal as an error signal output from the comparing circuit 117.

The self-diagnosis control unit 114 includes a register 114a and a register 114b. The register 114a and the register 114b are used in self diagnosis that operates at system start-up. A register address of the register 114a illustrated as an example in FIG. 2 is an address REG_A1. Similarly, a register address of the register 114b is an address REG_B1.

The register 112a of the self-diagnosis control unit 112 and the register 114a of the self-diagnosis control unit 114 are different in a register address from each other. However, the same value is written to the register 112a and the register 114a as a register group A. Similarly, the same value is written to the register 112b and the register 114b as a register group B. The value to be written to the register group A and the value to be written to the register group B are set to be different from each other.

The comparing circuit 117 compares a signal received from the master core 111 and a signal received from the checker core 113 with each other and outputs a comparison result to an output 20. For example, when the signal received from the master core 111 and the signal received from the checker core 113 are the same as each other, the comparing circuit 117 outputs a normal signal indicating that an operation is normal as a comparison result. Meanwhile, when the signal received from the master core 111 and the signal received from the checker core 113 are not the same as each other, the comparing circuit 117 outputs an error signal indicating that abnormality occurs.

The suppressing circuit 118 receives a debug start signal from the debug terminal 170. Upon receiving the debug start signal, the suppressing circuit 118 suppresses an operation of a preset circuit among the components of the central processing unit 110. Here, to suppress an operation of a circuit means to stop power supply for preventing a preset circuit from performing a normal function or to stop an input signal for preventing the present circuit from outputting a predetermined signal, for example.

The debug circuit 160 diagnoses whether an operation of the master core 111 is abnormal. For example, the debug circuit 160 causes a preset diagnosis input signal to occur, and inputs it to the master core 111. The debug circuit 160 then receives a diagnose output signal output from the master core 111 and checks it against an expected value that is stored in advance. In accordance with the check result, the debug circuit 160 determines whether the master core 111 is normal. The debug circuit 160 is coupled to the master core 111 and the debug terminal 170. Also, the debug circuit 160 has an output 40 and outputs a debug result to the output 40.

The debug terminal 170 is a terminal for receiving a signal from outside via an input 50 when the microcontroller 100 is debugged. The debug terminal 170 receives a debug start signal from an external device for debugging, for example, a computer, and outputs the received debug start signal to the inside of the microcontroller 100. The debug terminal 170 is coupled to the central processing unit 110 and the debug circuit 160.

Next, a function of the microcontroller 100 is described by way of a specific example. The microcontroller 100 has a function of diagnosing whether an operation of the master core 111 is normal by a clock-delayed dual-core lock-step method.

An example of a function of the central processing unit 110 is described below. For example, the central processing unit 110 receives a given input signal from an input 10. The received input signal is input to each of the master core 111 and the checker core 113. Then, the master core 111 and the checker core 113 each output a processing result to the comparing circuit 117. The comparing circuit 117 compares two signals with each other, and outputs a normal signal when the master core 111 and the checker core 113 have output the same processing result. Alternatively, the comparing circuit 117 does not output an error signal. In this case, the signal output from the master core 111 to an output 30 continues to be processed as a normal operation.

Meanwhile, when the master core 111 and the checker core 113 have not output the same processing result, the comparing circuit 117 outputs an error signal. In this case, the signal output from the master core 111 to the output 30 does not continue to be processed as a normal operation but is subjected to a process corresponding to occurrence of abnormality.

Figure 3:
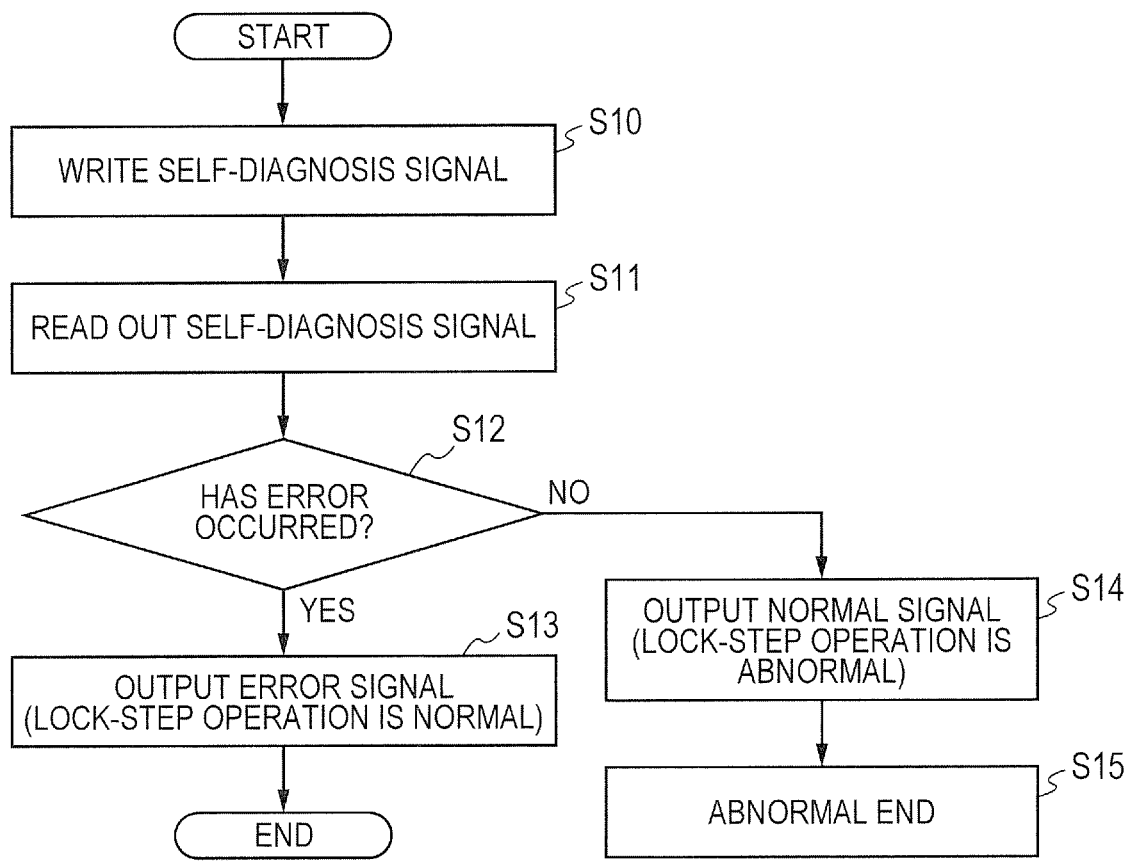
FIG. 3 is a flowchart of a start-up sequence of a microcontroller in a normal operation mode.

Next, a self-diagnosis function of the microcontroller 100 at system start-up in a normal operation is described referring to FIGS. 2 and 3. The self-diagnosis function of the microcontroller 100 sets an output value of the master core 111 and an output value of the checker core 113 to different values from each other and diagnoses that an error can be detected.

The normal operation mode described here is a case where a current mode is not a debug mode. That is, in the normal operation mode, no signal is input to the debug terminal 170. Further, the self-diagnosis function is a function of diagnosing whether the above-described clock-delayed dual-core lock-step method functions normally. Furthermore, a component illustrated with broken line in FIG. 3 represents that the component is not active in the self-diagnosis function of the microcontroller 100 at system start-up in the normal operation mode described below.

FIG. 3 is a flowchart at start-up of a microcontroller in a normal operation mode. The flowchart illustrated in FIG. 3 is a start-up sequence of the microcontroller 100.

First, when having started up, the microcontroller 100 performs writing of self-diagnosis signals (Step S10). Specifically, the microcontroller 100 writes preset values to the register 112a and the register 112b of the self-diagnosis control unit 112. At the same time, the microcontroller 100 writes preset values to the register 114a and the register 114b of the self-diagnosis control unit 114.

The value written to the register 112a of the self-diagnosis control unit 112 and the value written to the register 114a of the self-diagnosis control unit 114 are the same as each other, as described above. Also, the value written to the register 112b of the self-diagnosis control unit 112 and the value written to the register 114b of the self-diagnosis control unit 114 are the same as each other. However, the microcontroller 100 is set in such a manner that, after the self-diagnosis signals are written in the start-up sequence, the comparing circuit 117 outputs an error signal when reading the self-diagnosis signals and comparing them with each other. Specifically, as a value output to the comparing circuit 117, the value of the register 112a of the register group A is output as an output value on the master core 111 side. Meanwhile, the value of the register 114b of the register group B is output as an output value on the checker core 113 side. In this manner, setting is performed in such a manner that different values are output to the comparing circuit 117 in the start-up sequence in the normal operation. In a case where the comparing circuit 117 outputs the error signal, it is determined that a clock-delayed dual-core lock-step method functions normally.

The above setting is merely an example. The configuration of the microcontroller is not limited to the above-described configuration, as long as setting is performed in such a manner that an output of the master core 111 and an output of the checker core 113 are different from each other.

A self-diagnosis function is described below by way of a more specific example. For example, the microcontroller 100 writes "0xAA" to each of the register 112a and the register 114a and "0x55" to each of the register 112b and the register 114b as self-diagnosis signals (Step S10).

The microcontroller 100 then reads out the written self-diagnosis signals (Step S11). Specifically, the master core 111 reads out the value written to the register 112a of the self-diagnosis control unit 112, "0xAA", and outputs it to the comparing circuit 117, for example. At the same time, the checker core 113 reads out the value written to the register 114b of the self-diagnosis control unit 114, "0x55", and outputs it to the comparing circuit 117.

Subsequently, the comparing circuit 117 compares the self-diagnosis signals respectively output from the master core 111 and the checker core 113 with each other. The comparing circuit 117 then determines whether an error occurs (Step S12). When the values respectively output from the master core 111 and the checker core 113 are not the same, the comparing circuit 117 determines that an error occurs. Meanwhile, when the values respectively output from the master core 111 and the checker core 113 are the same as each other, the comparing circuit 117 does not determine that an error occurs.

In a case where the comparing circuit 117 compares the self-diagnosis signals and determines that an error occurs (Yes in Step S12), the comparing circuit 117 outputs an error signal to the output 20 (Step S13). In a case where the comparing circuit 117 outputs the error signal, by the self-diagnosis function, the above-described clock-delayed dual-core lock-step method functions normally. In this case, the start-up sequence of the microcontroller 100 ends normally and the microcontroller 100 goes to a next sequence.

In the above-described example, the comparing circuit 117 compares the value of the register 112a, "0xAA", and the value of the register 114b, "0x55" with each other. The value of the register 112a, "0xAA", and the value of the register 114b, "0x55", are not the same as each other. Therefore, in a case where the above-described clock-delayed dual-core lock-step method functions normally, the comparing circuit 117 outputs an error signal.

In a case where the comparing circuit 117 compares the self-diagnosis signals and does not determine that an error occurs (No in Step S12), the comparing circuit 117 outputs a normal signal to the output 20 (Step S13). In a case where the comparing circuit 117 outputs the normal signal, by the self-diagnosis function, the above-described clock-delayed dual-core lock-step method does not function normally. In this case, an abnormality has occurred in the above-described clock-delayed dual-core lock-step method, and therefore the microcontroller 100 ends abnormally (Step S15).

Figure 4:
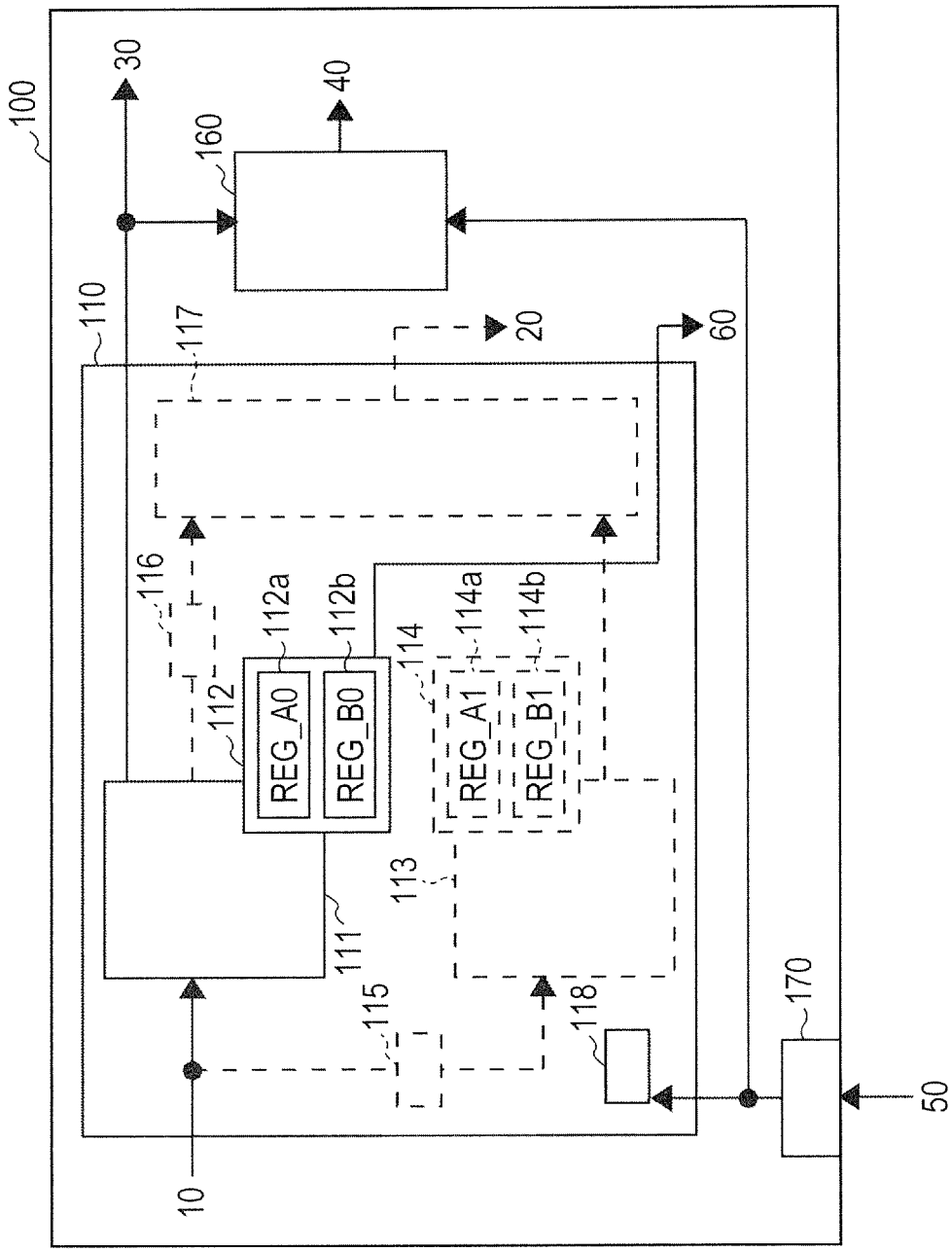
FIG. 4 is block diagram of the central processing unit 110 and its surrounding portion according to the first embodiment.

Next, operations of main functional blocks in a debug mode are described referring to FIG. 4. FIG. 4 is block diagram of the central processing unit 110 and its surrounding portion according to the first embodiment. In FIG. 4, the debug terminal 170 receives a debug start signal from an external device for debugging, for example, a computer, and outputs the received debug start signal to the inside of the microcontroller 100.

The debug start signal is output to the suppressing circuit 118 included in the central processing unit 110 and to the debug circuit 160 in the microcontroller 100 via the debug terminal 170.

The debug circuit 160 that has received the debug start signal from the debug terminal 170 performs a debug process of the microcontroller 100 based on a preset process. The specific contents of the debug process are not related to the present embodiment but are general techniques. Therefore, the detailed description is omitted here.

The suppressing circuit 118 that has received the debug start signal from the debug terminal 170 suppresses an operation of a preset circuit. Specifically, the suppressing circuit 118 stops operations of the delay circuits 115 and 116, the checker core 113, the self-diagnosis control unit 114, and the comparing circuit 117. In this manner, the microcontroller 100 stops the function of the clock-delayed dual-core lock-step method. That is, when the debug mode is started, the checker core 113 does not output a signal. Also, the comparing circuit 117 does not output a signal from the output 20. The component illustrated in FIG. 4 with broken line represents a state where an operation thereof is suppressed by the suppressing circuit 118.

Meanwhile, when the function of the clock-delayed dual-core lock-step method is stopped in the debug mode, the self-diagnosis control unit 112 outputs a pseudo error signal that is preset, to the output 60. By output of the pseudo error signal by the self-diagnosis control unit 112, the microcontroller 100 can complete a start-up sequence in the debug mode and can proceed to a next process.

Further, because of stop of the function of the clock-delayed dual-core lock-step method, power consumption of the microcontroller 100 is reduced in the debug mode by the amount corresponding to the stop of the function of the clock-delayed dual-core lock-step method. However, in the debug mode, the debug circuit starts up. Therefore, as compared with the normal operation mode, power consumption of the microcontroller 100 is increased by the amount corresponding to the start-up of the debug circuit and is reduced by the amount corresponding to the stop of the function of the clock-delayed dual-core lock-step method.

Figure 5:
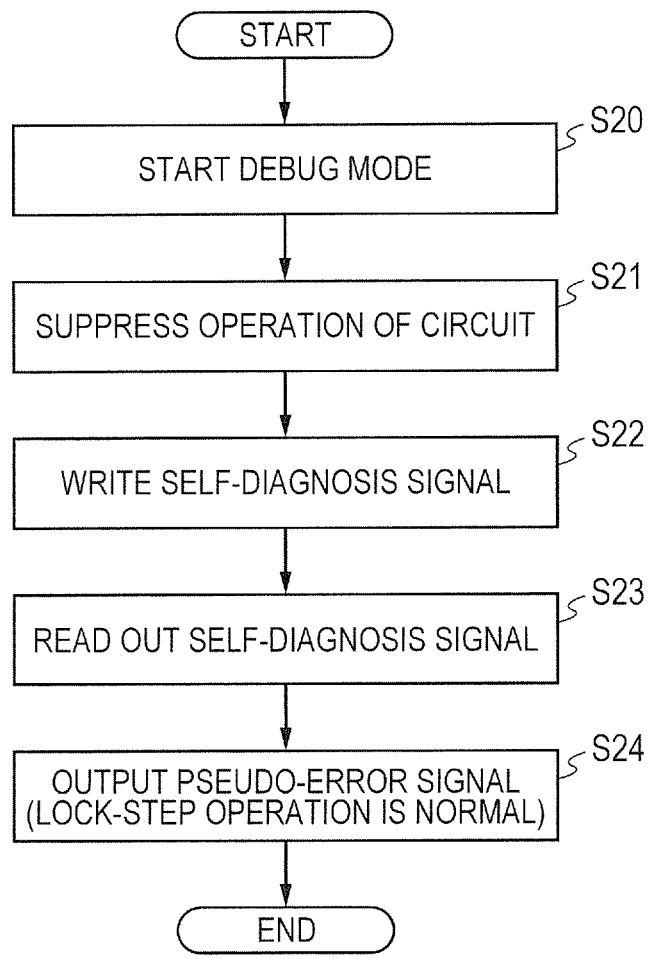
FIG. 5 is a flowchart of a start-up sequence of the microcontroller in a debug mode.

Next, a process at start-up in a debug mode is described referring to FIG. 5. FIG. 5 is a flowchart of a start-up sequence of a microcontroller in the debug mode.

First, when the microcontroller 100 starts up, the suppressing circuit 118 and the debug circuit receive a debug start signal (Step S20). Thus, the microcontroller 100 starts a process associated with the debug mode.

Then, the suppressing circuit 118 suppresses an operation of a preset circuit in response to the received debug start signal, as described referring to FIG. 4 (Step S21). Therefore, the function of the clock-delayed dual-core lock-step method is stopped.

Next, the microcontroller 100 performs writing of self-diagnosis signals (Step S22). Specifically, the microcontroller 100 writes preset values to the register 112a and the register 112b of the self-diagnosis control unit 112.

Subsequently, the microcontroller 100 reads out the written self-diagnosis signals (Step S23). Specifically, the master core 111 reads out the values written to the register 112a and the register 112b of the self-diagnosis control unit 112.

The self-diagnosis control unit 112 then outputs a pseudo error signal (Step S24). In the start-up sequence of the debug mode, the self-diagnosis control unit 112 is set to output the pseudo error signal after the master core 111 performs reading. For example, the self-diagnosis control unit 112 can be set to output the pseudo error signal in response to the signal from the suppressing circuit 118 and the reading operation for the register 112a or the register 112b.

When the self-diagnosis control unit 112 outputs the pseudo error signal, by the self-diagnosis function, a process is performed in the same manner as that in a case where the above-described clock-delayed dual-core lock-step method functions normally. In this case, the start-up sequence of the debug mode of the microcontroller 100 ends normally and the microcontroller 100 goes to a next sequence.

By the above-described configuration, the first embodiment can provide a microcontroller that suppresses increase of power consumption during debugging.

Modification of First Embodiment

Next, a modification of the first embodiment is described. As illustrated in FIG. 1, the microcontroller 100 includes the DMA control unit 120. In the DMA control unit 120, circuits are duplicated as in the central processing unit 110. A clock-delayed dual-core lock-step method is applied to the duplicated circuits. That is, the DMA control unit 120 includes a master core as a first signal processing circuit and a checker core as a second signal processing circuit.

Figure 6:
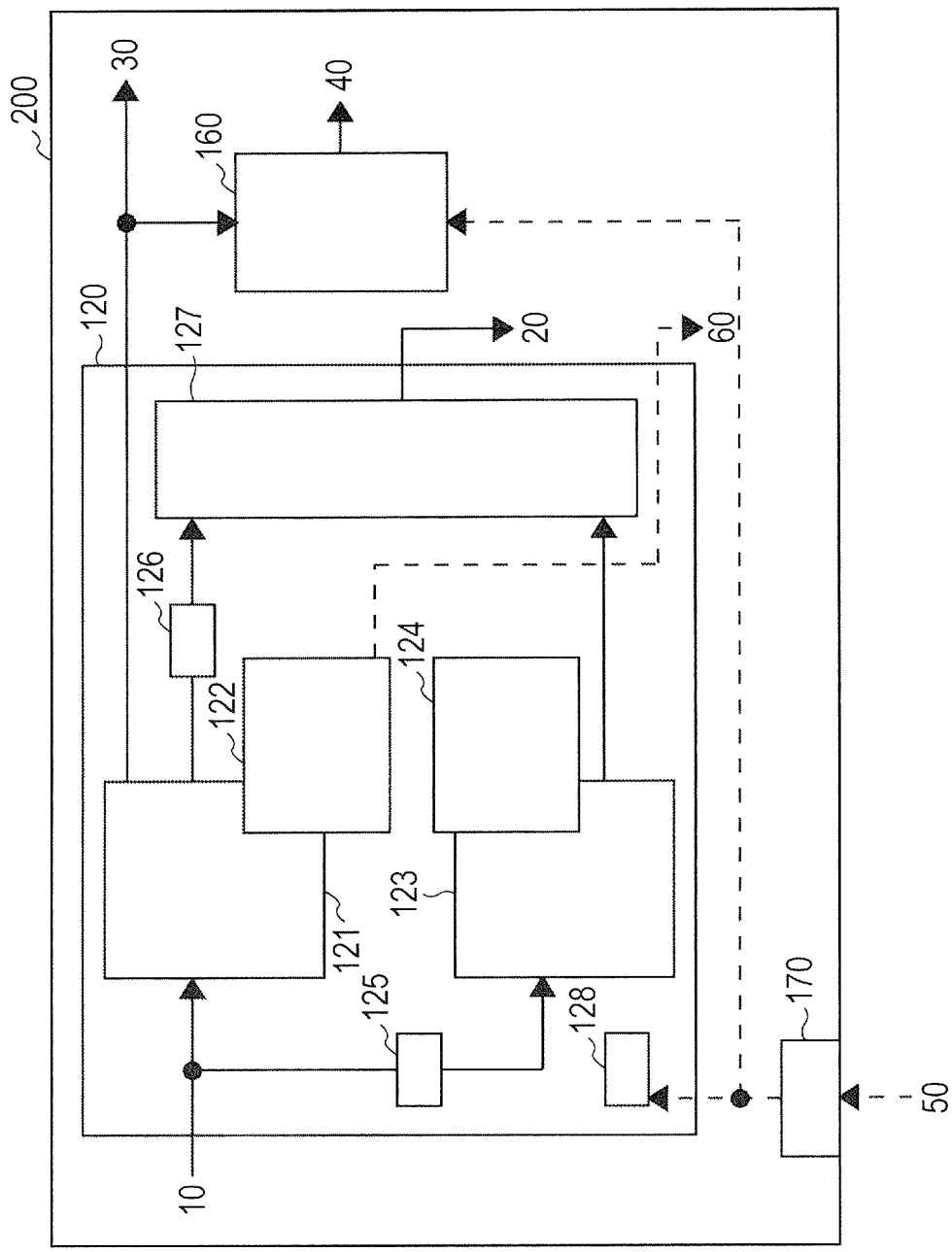
FIG. 6 is a block diagram of a microcontroller according to a modification of the first embodiment.

FIG. 6 is a block diagram of a microcontroller according to a modification of the first embodiment. A microcontroller 200 according to the modification of the first embodiment is obtained by applying the same configuration as that described referring to FIGS. 2 to 5 in the first embodiment to the DMA control unit 120. That is, the DMA control unit 120 according to the modification of the first embodiment includes the master core 121, the checker core 123, the self-diagnosis control units 122 and 124, the delay circuits 115 and 116, a comparing circuit 127, and a suppressing circuit 128 as main components. Except for the master core 121 and the checker core 123, the functions of the respective components are the same as those of the corresponding components described in the first embodiment. Therefore, the detailed description thereof is omitted.

By this configuration, the modification of the first embodiment can provide a microcontroller that suppresses increase of power consumption during debugging.

It should be noted that the configuration of the first embodiment and the configuration of the modification of the first embodiment are not mutually exclusive. That is, the microcontroller 100 or the microcontroller 200 can include the central process unit 110 described in the first embodiment and the DMA control unit 120 described in the modification of the first embodiment separately from each other or can include both at the same time. Further, in a case where there are a plurality of calculating units each corresponding to the central processing unit 110, the same configuration can be applied to all those calculating units. Furthermore, other than the central processing unit 110 and the DMA control unit 120, any duplicated components having a function of a dual-core lock-step method can have configurations and advantageous effects that are the same as those described above.

The microcontrollers 100 and 200 according to the first embodiment employ a clock-delayed dual-core lock-step method that has a delay circuit. However, a dual-core lock-step method that does not have a delay circuit can be also employed.

Second Embodiment

Figure 7:
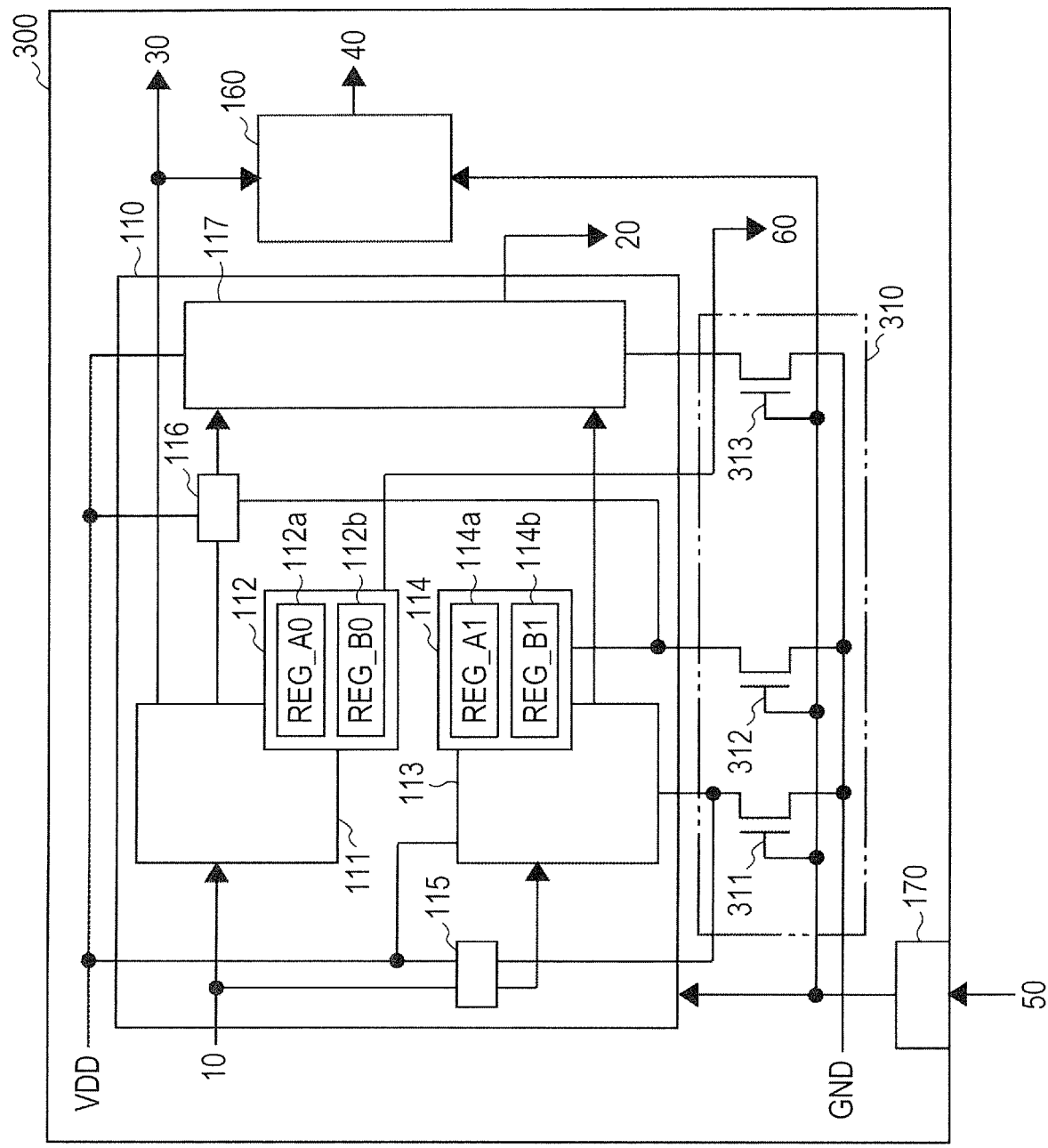
FIG. 7 is a block diagram of a microcontroller according to a second embodiment.

Next, a second embodiment is described below, referring to FIG. 7. FIG. 7 is a block diagram of a microcontroller according to the second embodiment. A microcontroller 300 illustrated in FIG. 7 is different from the microcontroller 100 according to the first embodiment in a configuration for suppressing a function of a clock-delayed dual-core lock-step method.

The configuration different from that of the first embodiment is described below. The microcontroller 300 illustrated in FIG. 7 includes a power-supply cut-off circuit 310. The power-supply cut-off circuit 310 has a function of cutting off power supply of a circuit to which the circuit 310 is coupled by receiving a preset signal.

The details of the power-supply cut-off circuit 310 illustrated in FIG. 7 as an example are described. The power-supply cut-off circuit 310 has MOSFETs (metal-oxide-semiconductor field-effect transistors). The MOSFETs are arranged in GND lines of the checker core 113, the self-diagnosis control unit 114, the delay circuits 115 and 116, and the comparing circuit 117. Further, the power-supply cut-off circuit 310 receives a signal output from the debug terminal 170. The signal output from the debug terminal 170 is coupled to gates of the MOSFETs of the power-supply cut-off circuit 310. The MOSFETs of the power-supply cut-off circuit 310 are so-called n-type MOSFETs. Therefore, the power-supply cut-off circuit 310 disconnects GND connection of the checker core 113, the self-diagnosis control unit 114, the delay circuits 115 and 116, and the comparing circuit 117 to which the circuit 310 is coupled, by receiving a debug start signal from the debug terminal 170. Thus, the power-supply cut-off circuit 310 can stop supply of power to the checker core 113, the self-diagnosis circuit 114, the delay circuits 115 and 116, and the comparing circuit 117 to which the circuit 310 is coupled.

By stopping supply of power to a circuit of which an operation is suppressed in this manner, the microcontroller 300 can reduce a leak current of the circuit of which an operation is suppressed during debugging. Therefore, the microcontroller 300 according to the second embodiment can provide a microcontroller that suppresses increase of power consumption during debugging.

The illustrated configuration of the power-supply cut-off circuit 310 is a configuration example of a main portion. A specific circuit configuration is not limited to that illustrated in FIG. 7.

The microcontroller 300 can include a plurality of duplicated circuits obtained by duplicating the above-described predetermined circuit blocks and a plurality of power-supply cut-off circuits associated with the duplicated circuits. In this case, the power-supply cut-off circuits each cut off power of a circuit block that is a portion of the duplicated circuits. In this case, the microcontroller 300 can start up these power-supply cut-off circuits simultaneously in response to a debug start signal and can stop an operation of the circuit block that is a portion of the duplicated circuits.

Further, the microcontroller 300 can stop the power-supply cut-off circuits that stop operations of the circuit blocks that are portions of the duplicated circuits, in a stepwise manner. In this case, the microcontroller 300 can stop an operation of a preset circuit block in accordance with an operation parameter of the microcontroller 300 during a debug process, for example. The operation parameter is a temperature, a current value, a voltage value, or power consumption or a combination thereof, for example. In this case, a circuit of which circuit block is stopped can process an operation of checking the duplicated circuits by the above-described function of outputting a pseudo error signal. In this manner, the microcontroller 300 can continue the debug process.

Furthermore, the microcontroller 300 can stop an operation of a circuit block in a stepwise manner in accordance with a value of power consumption of the microcontroller 300. That is, the microcontroller 300 can monitor a preset operation parameter among the above-described operation parameters and, when the monitored operation parameter exceeds a preset threshold value, can stop an operation of a circuit block in a stepwise manner. By employing this configuration, it is possible to suppress increase of power consumption and increase of a temperature in a debug state.

In the above, the invention made by the inventors of the present application has been specifically described by way of the embodiments. However, it is naturally understood that the present invention is not limited to the aforementioned embodiments, and can be changed in various ways within the scope not departing from the gist thereof.

What is claimed is:

1. A microcontroller comprising:
   a first signal processing circuit;
   a second signal processing circuit that performs signal processing in a same manner as the first signal processing circuit;
   a comparing circuit that compares a processing result of the first signal processing circuit and a processing result of the second signal processing circuit with each other, and outputs an error signal when an error is detected;
   a suppressing signal input unit that receives a suppressing signal for suppressing an operation of the second signal processing circuit and an operation of the comparing circuit;
   a suppressing circuit that receives the suppressing signal from the suppressing signal input unit and suppresses the operation of the second signal processing circuit and the operation of the comparing circuit; and
   a pseudo error signal output circuit that outputs a pseudo error signal in place of the error signal when the operation of the second signal processing circuit and the operation of the comparing circuit are suppressed,
   wherein when the operation of the comparing circuit is suppressed, a power supply to the comparing circuit is cut off.

2. The microcontroller according to claim 1, further comprising a debug circuit that performs a debug process by receiving a debug start signal from outside,
   wherein the suppressing signal is included in the debug start signal.

3. The microcontroller according to claim 2,
   wherein the pseudo error signal output circuit outputs the pseudo error signal when the suppressing signal is received and the first signal processing circuit outputs a preset reading signal at start-up.

4. The microcontroller according to claim 2,
   wherein the suppressing circuit further includes a circuit that individually suppresses operations of a plurality of circuit blocks, and
   wherein the suppressing circuit individually suppresses the operations of the circuit blocks in accordance with power consumption of the microcontroller in the debug process.

5. The microcontroller according to claim 2,
   wherein the suppressing circuit further includes a circuit that individually suppresses operations of a plurality of circuit blocks and a temperature sensor that measures a temperature inside the microcontroller or a temperature of a peripheral portion, and
   wherein the suppressing circuit individually stops the operations of the circuit blocks in accordance with the temperature in the debug process.

6. The microcontroller according to claim 1,
   wherein the first signal processing circuit includes a master core of a central processing unit, and
   wherein the second signal processing circuit includes a checker core of the central processing unit.

7. The microcontroller according to claim 1,
   wherein the first signal processing circuit includes a master core of a direct memory access controller, and
   wherein the second signal processing circuit includes a checker core of the direct memory access controller.

8. The microcontroller according to claim 1,
   wherein the first signal processing circuit includes a first delay unit that delays an output of the first signal processing circuit, and
   wherein the second signal processing circuit includes a second delay unit that delays an input of the second signal processing circuit.

9. The microcontroller according to claim 1, further comprising a power-supply cut-off circuit that cuts off power supply of the second signal processing circuit,
   wherein when the operation of the second signal processing circuit is suppressed, the power supply of the second signal processing circuit is cut off by the power-supply cut-off circuit.

10. A control method of a microcontroller that includes a first signal processing circuit, a second signal processing circuit that performs signal processing in a same manner as the first signal processing circuit, and a comparing circuit that compares a processing result of the first signal processing circuit and a processing result of the second signal processing circuit with each other, and outputs an error signal when an error is detected, the method comprising:
  receiving a debug start signal;
  suppressing an operation of the second signal processing circuit and an operation of the comparing circuit in response to the debug start signal; and
  outputting a pseudo error signal in place of the error signal, when the operation of the second signal processing circuit and the operation of the comparing circuit are suppressed,
  wherein when the operation of the comparing circuit is suppressed, a power supply to the comparing circuit is cut off.

* * * * *